United States Patent [19]

Strepparola et al.

[11] Patent Number: 4,810,760

[45] Date of Patent: Mar. 7, 1989

[54] VULCANIZABLE ELASTOMERIC COMPOSITIONS OF FLUOROELASTOMERS

[75] Inventors: Ezio Strepparola, Bergamo; Giovanni Moggi, Milan; Gianna Cirillo, Genova, all of Italy

[73] Assignee: Ausimont S.p.A., Milan, Italy

[21] Appl. No.: 928,403

[22] Filed: Nov. 10, 1986

[30] Foreign Application Priority Data

Nov. 15, 1985 [IT] Italy .................. 22864 A/85

[51] Int. Cl.$^4$ ................................................ C08F 8/20
[52] U.S. Cl. ................... 525/359.3; 525/200; 525/326.3; 525/376.4
[58] Field of Search ..................... 525/359.3, 200

[56] References Cited

U.S. PATENT DOCUMENTS

| | | | |
|---|---|---|---|
| 4,250,278 | 2/1981 | Suzuki et al. | 525/359.3 |
| 4,358,559 | 11/1982 | Holcomb et al. | 525/359.3 |

*Primary Examiner*—Joseph L. Schofer
*Assistant Examiner*—Bernard Lipman
*Attorney, Agent, or Firm*—Stevens, Davis, Miller & Mosher

[57] ABSTRACT

Vulcanizable compositions of fluoroelastomers based on vinylidene fluoride with one or more monomers containing an ethylenic unsaturation and at least one fluorine atom, which utilize as a cross-linking agent a dihydroxypolyfluoroether having a molecular weight of from 360 to 2000.

7 Claims, No Drawings

VULCANIZABLE ELASTOMERIC COMPOSITIONS OF FLUOROELASTOMERS

THE INVENTION

This invention relates to new cross-linking agents of the class of dihydroxypolyfluoroethers and to the use thereof in the vulcanization of fluoroelastomers based on vinylidene fluoride.

The vulcanized elastomers based on vinylidene fluoride copolymers, in which vinylidene fluoride is copolymerized with one or more monomers containing an ethylenic unsaturation and at least one fluorine atom, are well known and are broadly utilized in a plurality of applicative sectors, where an exceptional chemical stability with respect to solvents, lubricants, fuels, acids and analogous products, also at very high temperatures, is required.

The vulcanized articles obtained from such elastomeric polymers are most suitably utilized as sealing gaskets in general, in both static and dynamic conditions, in the automotive, aeronautic, missile, naval, mechanical, chemical sectors, in the protective impermeabilizations of various supports, as protective clothes for contact with aggressive chemical agents, or as sheaths for electric cables exposed to a strong heat radiation and, finally, protective coatings of industrial containers.

According to the most advanced prior art, the vulcanizable compositions of fluoroelastomers based on vinylidene fluoride comprise:

(A) a copolymer of vinylidene fluoride with at least another fluorinated monomer containing an ethylenic unsaturation;

(B) a vulcanization accelerator selected from the following: quaternary ammonium salts, quanternary phosphonium salts, phosphoranamine-derivatives;

(C) one or more basic acceptors (basic agents which are acceptors of acids), such as e.g., MgO and Ca(OH)$_2$; and (D) a cross-linking agent having a bisphenol structure, for example bisphenol AF.

Examples of these compositions are described in patents GB Nos. 1,356,344; U.S. Pat. No. 3,876,654; U.S. Pat. No. 4,259,463.

The use of cross-linking agents having the structure of bisphenols, as compared with the other cross-linking agents of the prior art, leads to a good stability of the fluoroelastomers with respect to heat treatments, said stability being accompanied, however, with not very high elastic characteristics as regards the compression set after the thermal post-treatment.

Furthermore, it is known to use other linear-chain cross-linking agents with hydroxyl end groups, such as for example those descried in U.S. Pat. No. 4,188,352. Representative examples of such compounds are:

HOCH$_2$—(CF$_2$)$_3$—CH$_2$OH, and

HOCH$_2$—CF$_2$—(CF$_2$)$_3$—CFHCF$_2$CH$_2$OH.

However, the preferred compositions, in terms of total balance of the vulcanizing properties of the fluoroelastomers based on vinylidene fluoride, are obtained by using compounds of the class of bisphenols, and in particular bisphenol AF.

There was the marked requirement of having available cross-linking agents capable of improving the stability with respect to thermal post-treatment associated with a better permanent resistance to compression (low compression set values) and with respect to the extrudability test.

It has now been found, unexpectedly and surprisingly, that the use of dihydroxypolyfluoroethers as cross-linking agents permits one to obtain a vulcanizate based on vinylidene fluoride having a better global or overall balance of the above-cited desirable properties even after a thermal post-treatment.

Thus, an object of the present invention is the employment of dihydroxypolyfluoroethers having a molecular weight ranging from 360 to 2000 (extremes included) selected from the classes of compounds comprising oxyfluoroalkylene repeating units as indicated hereinbelow:

(I): (C$_2$F$_4$O), (CF$_2$O), said units being statistically distributed along the fluoropolyoxyalkylene chain;

(II): (C$_3$F$_6$O), (C$_2$F$_4$O), (CFXO) with X=—F or —CF$_3$, said units being statistically distributed along the fluoropolyoxyalkylene chain;

(III): —CH$_2$—CF$_2$—CF$_2$—O—, these units inside the fluoropolyoxyalkylene chain being bound to one another in the following manner:

—(O—CF$_2$—CF$_2$—CH$_2$)$_p$—O—R$_f$—O(—CH$_2$—CF$_2$—CF$_2$—O)$_q$— wherein R$_f$ is a fluoroalkylene group containing from 1 to 8 carbon atoms, and wherein p and q are integers, p being from 1 to 6 and q being from 1 to 6; and (IV):

(CFCF$_2$O),
|
CF$_3$ said units being linked to one another inside the fluoropolyoxyalkylene chain in the following manner:

$$+\text{O}-\text{CF}_2-\underset{\underset{\text{CF}_3}{|}}{\text{CF}}-)_a\text{O}-\text{CF}_2-(\text{R}_f)_x-\text{CF}_2-\text{O}-\left[\underset{\underset{\text{CF}_3}{|}}{\text{CF}}-\text{CF}_2-\text{O}\right]_b+$$

wherein R$_f$ is a fluoroalkylene groups containing from 1 to 8 carbon atoms, x is 0 or 1, and a and b are integers, a being from 1 to 4 and b being from 1 to 4.

The diols of these classes may also be used in admixture with one another.

Fluoropolyoxyalkylene diols belonging to Class I are selected in particular from among those having the following formula:

HZ—CF$_2$O(C$_2$F$_4$O)$_m$(CF$_2$O)$_n$CF$_2$—ZH wherein $$Z = -\underset{\underset{E}{|}}{\overset{\overset{D}{|}}{C}}-O-$$

and where the radicals D and E are the same or different and are selected from —H, —CH$_3$ and —CF$_3$, m and n are integers the sum of which is from 2 to 22, and m/n ranges from 0.5 to 1.5, the oxyfluoroalkylene units being statistically distributed along the chain. These compounds can be prepared, for example, according to methods described in U.S. Pat. No. 3,810,874.

Fluorinated diols belonging to Class II are selected in particular from among compounds having by the following formula:

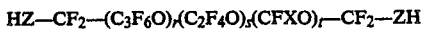

in which X is —F or —CF$_3$, indexes r, s, t are integers, r being from 1 to 3, s being from 1 to 7, and t being from 1 to 7 and Z is the same as defined hereinabove.

Such compounds may be prepared by the photo-oxidation of mixtures of C$_3$F$_6$ and C$_2$F$_4$, as described in U.S. Pat. No. 3,665,041, and by subsequent conversion of end groups —COF to groups containing end groups —OH, such conversion being carried out according to per se known methods described in U.S. Pat. Nos. 3,847,978 and 3,810,874.

Fluorinated diols belonging to Class III are selected in particular from among compounds having the formula:

and described in European patent publication EP No. 148,482, in which end groups —COF can be converted to end groups —OH, as is described in U.S. Pat. Nos. 3,847,978 and 3,810,874, Z is the same as defined hereinabove, and R$_f$ is a perfluoroalkylene radical, and in particular —CF$_2$—CF$_2$—.

Fluorinated diols belonging to Class IV are selected in particular from among compounds having the formula:

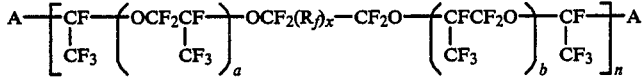

wherein A is a group comprising end group —OH, for example —CH$_2$OH, and n is an integer equal to or higher than 1.

Such compounds are described in European patent application EP No. 151,877.

The fluoroelastomers forming component (A) are generally copolymers of vinylidene fluoride with hexafluoropropene, either or not containing tetrafluoroethylene as a comonomer.

Instead of hexafluoropropene, one may use chlorotrifluoroethylene, 1-hydropentafluoropropene, 2-hydropentafluoropropene.

One may also use mixtures of the above-said comonomers.

The tetrafluoroethylene and/or hexafluoropropene units in the copolymer may be partially or fully substituted by perfluoroalkylvinylether units.

The amount of perfluoroalkylvinylether is generally from 0.5 to 15% by moles based on the total amount of copolymer, and preferably is less than 5% by moles.

One may also employ as comonomers other flluorinated monomers provided they contain an ethylene-type double bond and at least one fluorine atom.

Compounds (A) are preparable as is described in the literature (e.g., Kirk-Othmer, Encyclopaedia of Chemical Technology, Vol. 8, page 500 and following, 1979) by operating preferably in aqueous emulsion and optionally in the presence of chain transfer agents such as those described in U.S. Pat. No. 4,000,356.

Preferred in particular are the copolymers in which vinylidene fluoride ranges from 40% to 85% by moles, perfluoropropene ranges from 15% to 30% by moles, and tetrafluoroethylene ranges from 0% to 30% by moles.

Vulcanization accelerator (B) mentioned above belongs to the previously cited classes, the preferred compounds being the following:

among the quaternary ammonium salts: methyltrioctylammonium chloride, laurylpyridinium bromide, benzyltrioctylammonium chloride;

among the quaternary phosphonium salts: benzyltriphenylphosphonium chloride, benzyltriphenylphosphonium tetrafluoroborate, methyltrioctylphosphonium acetate, carbethoxymethyltriphenylphosphonium bromide; and among the phosphoramine-derivatives or amino-phosphonium compounds: 1-chloro, 1-benzyl, 1-diphenyl-N(diethyl)phosphoranamine; 1-tetrafluoroborate, 1-benzyl, N,N',N"(hexamethyl)phosphorantriamine; 1-bromo, 1-benzyl, 1-phenyl N, N'(tetraethyl)phosphorandiamine.

Component (C), the basic acceptor, is an inorganic compound such as, for example, an oxide of a divalent metal, for example ZnO, MgO, PbO, CaO, or a mixture of oxide and hydroxide of said metals or salts of weak acids, as described in U.S. Pat. No. 3,876,654.

Component (D) of the present invention is a dihydroxypolyfluoroether as defined above.

Generally, for 100 parts by weight of an elastomeric copolymer of vinylidene fluoride (A) with one or more fluorinated monomers as indicated hereinabove there are employed:

1 to 40 parts by weight of basic acceptor (C) consisting of one or more oxides of divalent metals, as above specified, optionally in the form of cationic complexes or chelates, and optionally in the presence of 0-10 parts by weight of one or more basic compounds selected from the group consisting of calcium, strontium and barium hydroxides, metal salts of weak acids such as carbonates, benzoates and phosphates of calcium, strontium, barium, sodium and potassium, optionally in the form of complexes with the usual cationic chelating or complexing compounds of the type well known per se to those skilled in the art;

1 to 15 parts by weight of a dihydroxypolyfluoroether (D) as specified hereinabove; and 0.05 to 5 parts by weight of a vulcanization accelerator (B) selected from those of the above-described classes (I), (II), (III) and (IV).

The vulcanizable compositions of the above-cited type are vulcanized by means of a process which consists in heating said compositions at first under pressure, at temperatures from 130° to 230° C., and preferably from 160° to 200° C., for a period of time between 0.5 and 60 minutes and preferably between 1 and 20 minutes; the resultant articles being then post-vulcanized in an oven or in a furnace, at atmospheric pressure, at temperatures between 130° and 315° C., and preferably between 200° and 275° C., for a period of time from 5 to 48 hours, and preferably from 10 to 24 hours.

It has, surprisingly, been ascertained that the vulcanizable compositions of the present invention may be transformed into useful articles of any shapes and dimensions, through extrusion molding and subsequent vulcanization, utilizing if desired highly automated injection technologies. Actually, no drawbacks due to scorching or hot tearing phenomena are encountered at the plastification temperatures usually employed for injection molding.

Such articles exhibit an excellent stability with respect to permanent compression deformation, a very low tendency to scorching as a function of the storage time and temperature or of the temperatures of particular processing technologies such as, for example, extrusion technology, and exhibit also a high stability with respect to thermal ageing. Furthermore, the articles may be readily bonded to various kinds of metal substrates toward which they exhibit a considerable adhesion even at high temperatures.

It has also been observed that the vulcanizable compositions comprising components (A) through (D) cited hereinbefore do not cause phenomena of stickiness to the molds or of soiling of same, wherefore there are practically no production rejections, thus permitting one to attain high production standards together with the utmost regular processing cycles.

More generally, the present invention is advantageously applicable to all the fluorinated polymeric materials based on vinylidene fluoride of the elastomeric type, optionally also containing substituents other than fluorine and chlorine, and also to mixtures of two or more such fluorinated elastomers.

In addition to the aforesaid materials (A) through (D), the vulcanizable compositions according to the present invention may contain carbon black, white and colored fillers, conventional plasticizers and lubricants such as stearates, arylphosphates, polyethers, polyesters, polyethylene, sulphones, sulphoxides and other known additives, according to techniques conventionally employed by users of fluorinated elastomers.

The components of the vulcanizable compositions according to the present invention may be readily incorporated into the elastomeric copolymers of vinylidene fluoride, either individually or premixed.

In this way it is possible to reach good vulcanization rates at the usual processing temperatures without any risk of scorchings (prevulcanization) during the preliminary processing steps which precede the actual vulcanization.

A further advantage of the present invention resides in the complete elimination of the undesired phenomena of "reduced mold shrinkage" during vulcanization, in a closed mold and under pressure, of fluorinated elastomer articles, and particularly in the case of the manufacture of O-ring gaskets.

In a preferred embodiment of the present invention, the mixture of phosphoramine accelerator (B) (0.2-2 parts by weight) and of dihydroxypolyfluoroether cross-linking agent (D) (2-8 parts by weight) is added to the fluorinated elastomer (100 parts by weight) prior to the addition of the basic acceptor (2-10 parts by weight), of the basic compounds (1-7 parts by weight), of the reinforcing and inert fillers, the lubricants, the plasticizers and further optional additives.

By operating in this way one may achieve a prompt, controllable and uniform vulcanization, without giving rise to undesired phenomena, such as scorching during the various processing steps of the mixture or during storage.

Vulcanized elastomers prepared from the compositions of the present invention are utilizable as sealing gaskets, in both static and dynamic conditions, in the automotive, mechanical, and naval sectors, as protective garments for contact with aggressive chemical agents, as sheaths for the protection of electric cables when exposed to intense thermal radiation, and in analogous appliances as already mentioned.

The following examples are given merely to illustrate the present invention and are not to be construed as limitative.

EXAMPLES 1-6

In the examples reported in Table 1 the following products were used:

Fluoroelastomer: $CH_2=CF_2/C_3F_6$ copolymer in the molar ratio 4/1, having a specific weight of 1.8 at 25° C., known as Tecnoflon NM (trademark of Montedison S.p.A.).

Accelerator 1: 1-chloro-1,1-diphenyl-1-benzyl-N-diethyl-phosphoranamine.

Accelerator 2: benzyltriphenylphosphonium chloride.

Dihydroxypolyfluoropolyether 1: cross-linking agent of formula $HOCH_2CF_2(C_2F_4O)_m(CF_2O)_nCF_2CH_2OH$ and having a mean molecular weight based on the hydroxyl titer of 400 and an m/n ratio=0.9.

Dihydroxypolyfluoropolyether 2: of formula the same as the preceding one but having a mean molecular weight of 800.

The results of the tests reported in Table 1 show that the compositions of the present invention lead to better compression set values, to an improvement of the heat stability properties after ageing at 270° C., and to an improvement in the extrudability test when compared with the values obtained in Comparative Example 1, wherein bisphenol AF is utilized as a cross-linking agent.

TABLE 1

| Elastomeric composition: | | Example | | | | | |
|---|---|---|---|---|---|---|---|
| | | 1 | 2 | 3 | 4 | 5 | 6 |
| VULCANIZATION: in press at 170° C. for 10 min, in oven at 250° C. for 16 hours | | | | | | | |
| Elastomer 1 | p. by wt. | 100 | 100 | 100 | 100 | 100 | 100 |
| Bisphenol AF | p. by wt. | 1.7 | — | — | — | — | — |
| Accelerator 1 | p. by wt. | 0.48 | 0.48 | 0.4 | 0.48 | — | 0.48 |
| Accelerator 2 | p. by wt. | — | — | — | — | 0.5 | — |
| Dihydroxyfluoropolyeter 1 | p. by wt. | — | 4 | 4 | — | — | 3 |
| Dihydroxyfluoropolyeter 2 | p. by wt. | — | — | — | 6.0 | 6.0 | — |
| MgO | p. by wt. | 3 | 3 | 3 | 3 | 3 | 3 |
| Ca(OH)$_2$ | p. by wt. | 6 | 6 | 6 | 6 | 6 | 6 |

TABLE 1-continued

| Elastomeric composition: | | Example | | | | | |
|---|---|---|---|---|---|---|---|
| | | 1 | 2 | 3 | 4 | 5 | 6 |
| Carbon Black MT | p. by wt. | 30 | 30 | 30 | 30 | 30 | 30 |
| Extrudability Test (5) | (edge | 7 | 8 | 8 | 8 | 9 | 8 |
| Extrudability Test (5) | (surface | B | A | A | A | A | A |
| Characteristics Of The Vulcanizate | | | | | | | |
| Tensile strength (1) | MPa | 16.8 | 16.3 | 16.0 | 16.5 | 16.0 | 15.5 |
| Modulus at 100% (1) | MPa | 7.5 | 8.2 | 7.8 | 8.5 | 8.0 | 8.5 |
| Elongation at break (1) | % | 175 | 160 | 150 | 155 | 160 | 150 |
| Shore hardness A (2) | points | 75 | 76 | 73 | 78 | 76 | 78 |
| "Compression set" on discs, compression during 70 hours at 200° C. (3) | % | 17 | 15 | 13 | 14 | 15 | 16 |
| Thermal Stability at 275° C. for 70 hours (4) | | | | | | | |
| Δ Tensile strength | % | −35 | −10 | −8 | −10 | −12 | −11 |
| Δ Elongation at break | % | +15 | −5 | −4 | −7 | −8 | −6 |
| Δ Shore hardness A | points | +3 | +2 | +1 | +2 | +2 | +2 |

(1) ASTM D 412
(2) ASTM D 2240
(3) ASTM D 395 - Method B
(4) ASTM D 573
(5) ASTM D 2230 - 73 Method A - System B

What is claimed is:

1. Vulcanizable compositions of fluoroelastomers based on vinylidene fluoride having improved processability properties and an improved stability with respect to heat post-treatments, and comprising, as cross-linking agents, from 1 to 15 parts by weight per 100 parts of fluoroelastomer of dihydroxy-polyfluoroethers having a molecular weight from 360 to 2000 selected from the classes of compounds comprising oxyfluoroalkylene repeating units as indicated hereinbelow:

(I): $(C_2F_4O)$, $(CF_2O)$, said units being statistically distributed along the fluoropolyoxyalkylene chain;

(II): $(C_3F_6O)$, $(C_2F_4)$, $(CFXO)$ with $X = -F$ or $-CF_3$, said units being statistically distributed along the fluoropolyoxyalkylene chain;

(III): $-CH_2-CF_2-CF_2-O-$, these units inside the fluoropolyoxyalkylene chain being linked to one another in the following manner:

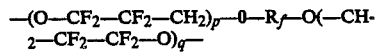

wherein $R_f$ is a fluoroalkylene group, p and q are integers; and (IV):

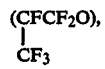

said units being linked to each other inside the fluoropolyoxyalkylene chain in the following manner:

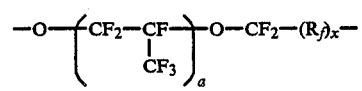

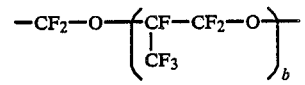

wherein $R_f$ is a fluoroalkylene group, x is 0 or 1, a and b are integers.

2. The vulcanizable compositions of claim 1, wherein the fluoropolyoxyalkylene diols belonging to Class I are selected from those having the formula:

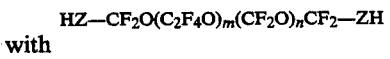

with

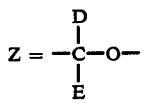

where the radicals D and E are like or unlike each other and are selected from $-H$, $-CH_3$ and $-CF_3$, m and n are integers, and m/n ranges from 0.5 to 1.5 with the oxyfluoroalkylene units being statistically distributed along the chain.

3. The vulcanizable compositions of claim 1, wherein the fluorinated diols belonging to Class II are selected from compounds having the formula:

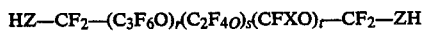

in which X is $-F$ or $-CF_3$, indexes r, s, t are integers, and Z is the same as defined hereinbefore.

4. The vulcanizable compositions of claim 1, wherein the fluorinated diols belonging to Class III are selected from the compounds having the formula:

where Z is the same as defined hereinabove.

5. The vulcanizable compositions of claim 1, wherein the fluorinated diols belonging to Class IV are selected from compounds having the formula:

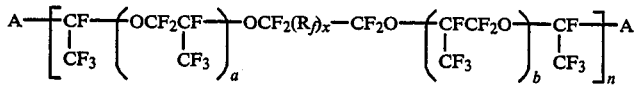

where A is a group comprising end group —OH, and n is an integer equal to or greater than 1.

6. The vulcanizable compositions of claim 1, wherein the fluoroelastomer consists of a copolymer of vinylidene fluoride, hexafluoropropene and, optionally, tetrafluoroethylene.

7. The vulcanizable compositions of claim 1 wherein 1-chloro-1,1-diphenyl-1-benzyl-N-diethyl phosphoranamine is used as an accelerator.

* * * * *